United States Patent [19]

Martinelli

[11] 4,305,699

[45] Dec. 15, 1981

[54] BLADE FOR A WIND MOTOR

[75] Inventor: Gabriele Martinelli, Piossasco, Italy

[73] Assignee: Centro Ricerche Fiat S.p.A., Orbassano, Italy

[21] Appl. No.: 110,727

[22] Filed: Jan. 9, 1980

[30] Foreign Application Priority Data

Feb. 15, 1979 [IT] Italy ............................... 67327 A/79

[51] Int. Cl.³ .............................................. F03D 1/06
[52] U.S. Cl. ............................... 416/226; 416/229 R; 416/241 A
[58] Field of Search .................... 416/226, 229, 241 A; 29/156.8 P

[56] References Cited

U.S. PATENT DOCUMENTS

| | | | |
|---|---|---|---|
| 2,400,649 | 5/1946 | Larsen | 416/226 |
| 2,450,455 | 10/1948 | Snyder | 416/226 |
| 2,591,757 | 4/1952 | Young | 416/226 |
| 2,648,388 | 8/1953 | Haines | 416/229 |
| 2,916,808 | 12/1959 | Wilkes | 416/226 |
| 3,647,317 | 3/1972 | Furlong | 416/226 |

FOREIGN PATENT DOCUMENTS

| | | | |
|---|---|---|---|
| 955113 | 12/1956 | Fed. Rep. of Germany | 416/226 |
| 226301 | 12/1924 | United Kingdom | 416/226 |

*Primary Examiner*—Douglas Hart
*Attorney, Agent, or Firm*—Sughrue, Mion, Zinn, Macpeak and Seas

[57] ABSTRACT

A blade for a wind motor comprises a load-bearing structure and an external covering of plastic material. The load-bearing structure is of flat tubular form and is composed of a pair of facing half shells constituted by sheet metal pressings of substantially channel section. Flat-bottomed impressions are provided along the edges of the shells. The shells are joined together by spot welds welding the bottoms of the impressions of one shell to the bottoms of corresponding impressions of the other shell.

4 Claims, 4 Drawing Figures

BLADE FOR A WIND MOTOR

The present invention relates to a blade for a wind motor, the blade being of the type comprising a load-bearing structure attachable at the root end of the blade to a rotary mounting, and an outer covering of plastic material carried by the load-bearing structure.

The object of the present invention is to provide a blade of the aforesaid type which is robust yet light, and is both simple and economical to produce.

In order to achieve this object, the present invention provides a blade of the type indicated above, in which the load-bearing structure comprises an elongate reinforcing element of flat tubular form which tapers towards the free end of the blade, the said tubular reinforcing element being composed of a pair of facing half shells constituted by sheet metal pressings of substantially channel section, said shells being provided along their edges with a plurality of separate impressions each with a flat base with dimensions sufficient to accommodate a spot weld, the flat base of each impression of one half shell being joined by means of a spot weld to the flat base of a corresponding said impression of the other half shell.

The blade is therefore composed of only a small number of parts which can be assembled together relatively quickly and economically due to the simple assembly techniques involved.

The impressions formed in the edges of each half shell, are preferably substantially semi-circular in profile and ensure stable and effective retention of the external plastic covering by the load-bearing structure.

Preferably, the tubular reinforcing element has a hollow axial stub of rectangular cross-section which projects through the covering of plastic material and which is provided on two opposite faces with stiffening plates, said hollow stub being arranged to receive therewithin a rectangular portion of a shaft carried by said rotary support, and said plates and stub being formed with aligned holes through which bolts can be passed to secure the blade to said rectangular shaft portion.

Due to this arrangement, the mounting of the blade on the rotary support of the wind motor can be carried out quickly and easily.

A blade embodying the invention will now be particularly described, by way of example with reference to the accompanying drawings, in which.

Figure 1:
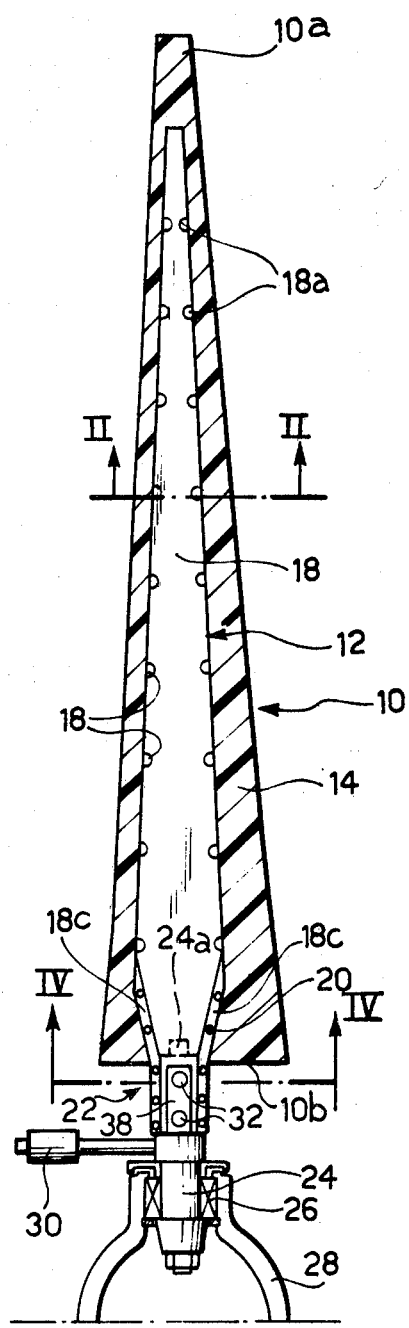
FIG. 1 is a part-sectional plan view of the blade.
Figure 2:
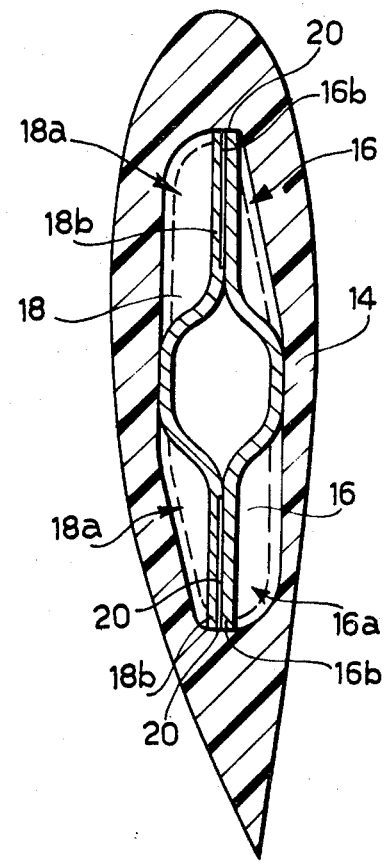
FIG. 2 is a section on line II—II of FIG. 1 to a larger scale.

The blade 10 shown in the drawings is intended for use in a wind motor, that is a motor designed to convert the energy of the winds into a form in which it can be used to drive a machine.

The blade 10 is composed of a metallic load-bearing structure 12 surrounded by an external covering 14 of plastic material. The external covering 14 is shaped like a wing with an aerofoil cross-section and a plan profile which is trapezoidal in form and tapers towards the free end 10a of the blade.

Figure 3:
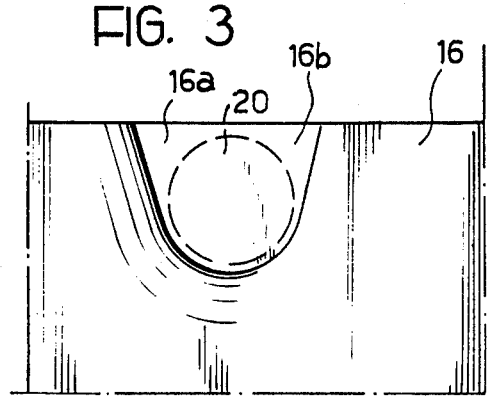
FIG. 3 is an enlarged elevational view of part of the blade illustrated in FIG. 1.

The load-bearing structure 12 consists of a tubular reinforcing element which has a flat profile in cross section and which tapers towards the free end 10a of the blade 10. This reinforcing element is formed by a pair of facing, symmetrical half shells of pressed metal sheet, each of which presents a substantially similar channel profile in cross-section. The half shells 16, 18 are provided along their facing edges, in corresponding axial positions, with a plurality of impressions 16a, 18a of semi-circular profile; one such impression 16a is illustrated in detail in FIG. 3. The impressions 16a, 18a each have a flat base 16b, 18b with dimensions corresponding to the dimensions of a spot weld. The base 16b of each impression 16a is joined to the base 18b of the corresponding impression 18a by means of a spot weld 20.

In addition to enabling the half shells 16 and 18 to be joined together by spot welding, the impressions 16a and 18a serve to positively locate internal projections on the external plastic covering 14 and thereby ensure accurate and secure anchoring of the covering 14 to the load-bearing structure 12.

Figure 4:
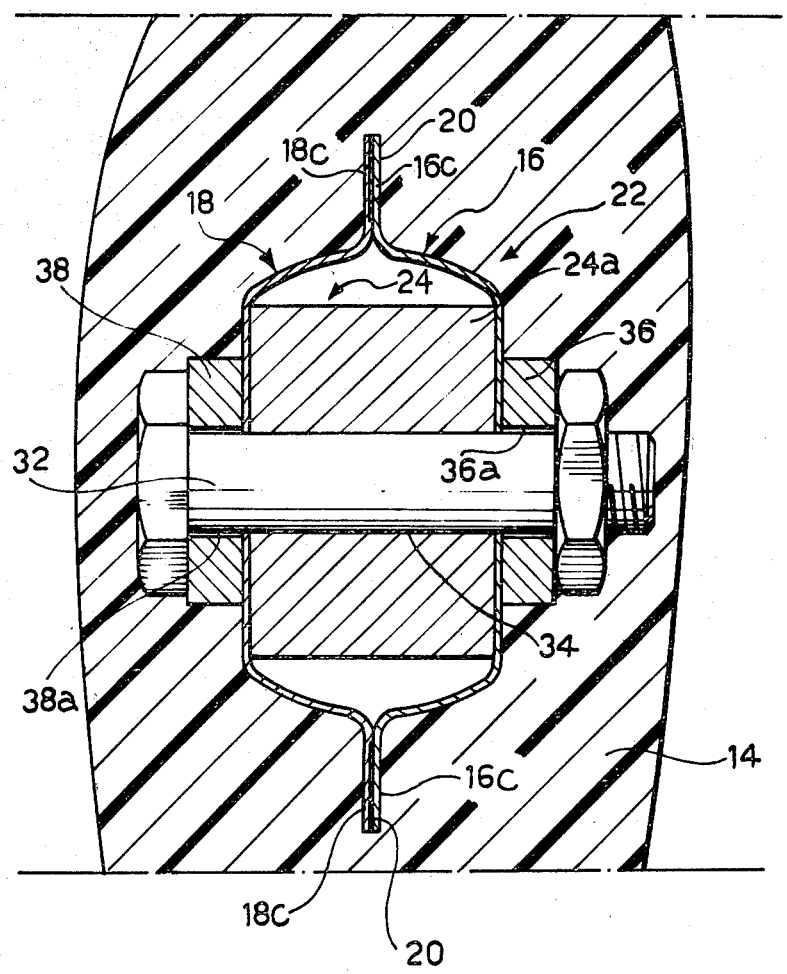
FIG. 4 is a section on line IV—IV of FIG. 1 to a larger scale.

In correspondence to the root 10b of the blade 10, the load-bearing structure 12 has a tubular axial stub 22 protruding through the plastic covering 14. In the region of the axial stub 22, the half shells 16, 18 have flanged edges 16c, 18c which are joined together by means of spot welds 20. As can be seen in FIG. 4, the axial stub 22 is of rectangular cross-section and is arranged to receive the rectangular end 24a portion of a shaft 24. The shaft 24 is supported by a rolling bearing 26 in a rotary support 28 of the wind motor. The shaft 24 and the axial stub 22 together support a centrifugal mass 30 which serves to orientate the blade 10, in the usual manner. The rectangular end 24a of the shaft 24 is secured inside the axial stub 22 by means of a pair of radial through bolts 32 which pass through transverse holes 34 formed in the end 24a of the shaft 24 and through corresponding holes formed in the half shells 16 and 18. The bolts 34 also pass through holes 36a, 38a formed in two rectangular stiffening plates 36, 38 welded to opposite outer faces of the stub 22.

I claim:

1. A blade for a wind motor comprising a load-bearing structure attachable at the root end of the blade to a rotary support, and an external covering of plastic material carried by the load-bearing structure, said load-bearing structure comprising an elongate reinforcing element of flat tubular form which tapers towards the free end of the blade, the said tubular reinforcing element being composed of a pair of facing half shells constituted by sheet metal pressings of substantially channel section, said shells being formed along their edges to define a plurality of separate impressions each with a flat base with dimensions sufficient to accommodate a spot weld, the flat base of each impression of one said half shell being joined by means of a spot weld to the flat base of a corresponding said impression of the other said half shell.

2. A blade according to claim 1, wherein the impression of each said half shell have a substantially semi-circular profile.

3. A blade according to claim 1, wherein at the said root end of the blade, the said tubular reinforcing element has a hollow axial stub of rectangular cross-section which projects through the said covering of plastic material and which is provided on two opposite faces with stiffening plates, said hollow stub being arranged to receive therewithin a rectangular portion of a shaft carried by said rotary support, and said plates and stub defining aligned holes through which bolts can be passed to secure the blade to said rectangular shaft portion.

4. A blade according to claim 3, wherein the portions of the two said half shells forming said axial stub of the tubular reinforcing element have flanged edges joined together by spot welds.

* * * * *